US012614296B2

(12) United States Patent
Kim et al.

(10) Patent No.: US 12,614,296 B2
(45) Date of Patent: Apr. 28, 2026

(54) METHOD AND APPARATUS WITH DEPTH INFORMATION ESTIMATION

(71) Applicant: SAMSUNG ELECTRONICS CO., LTD., Suwon-si (KR)

(72) Inventors: Jiwhan Kim, Suwon-si (KR); Sungjoo Suh, Suwon-si (KR); Minsu Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 18/315,597

(22) Filed: May 11, 2023

(65) Prior Publication Data

US 2024/0161322 A1 May 16, 2024

(30) Foreign Application Priority Data

Nov. 11, 2022 (KR) ........................ 10-2022-0150687

(51) Int. Cl.
*G06T 7/55* (2017.01)
(52) U.S. Cl.
CPC ...... *G06T 7/55* (2017.01); *G06T 2207/10061* (2013.01); *G06T 2207/20081* (2013.01); *G06T 2207/20084* (2013.01); *G06T 2207/30148* (2013.01)
(58) Field of Classification Search
CPC ............. G06T 7/55; G06T 2207/10061; G06T 2207/30148; G06T 7/50; G06T 3/40; G06T 2207/10028; G06T 7/0004; G06T 2207/10056; G06T 2207/20084; G06N 3/08
See application file for complete search history.

(56) References Cited

U.S. PATENT DOCUMENTS

| | | | |
|---|---|---|---|
| 10,170,272 B2 * | 1/2019 | Kaminer | ............... H01J 37/263 |
| 10,763,075 B2 | 9/2020 | Campbell et al. | |
| 2021/0183089 A1 * | 6/2021 | Wadhwa | ................. G06T 7/557 |
| 2023/0185198 A1 * | 6/2023 | Kagan | ............... H01L 21/02285 |
| | | | 428/206 |
| 2024/0054669 A1 * | 2/2024 | Houben | .................... G06T 5/50 |

(Continued)

FOREIGN PATENT DOCUMENTS

| | | |
|---|---|---|
| CN | 114693871 A | 7/2022 |
| KR | 10-0347764 B1 | 7/2002 |

(Continued)

OTHER PUBLICATIONS

Houben, Tim, et al. "Depth estimation from a single CD-SEM image using domain adaptation with multimodal data." *Fourteenth International Conference on Machine Vision (ICMV* 2021). vol. 12084. SPIE, 2022.

(Continued)

*Primary Examiner* — Delomia L Gilliard
(74) *Attorney, Agent, or Firm* — NSIP Law

(57) ABSTRACT

A method of estimating depth information includes generating a first simulated image using a simulator provided with a first depth map, training an artificial neural network model based on the first depth map and the first simulated image, generating a second depth map by inputting an actual image into the trained artificial neural network model, and generating a second simulated image using the simulator provided with the second depth map.

18 Claims, 8 Drawing Sheets

(56) References Cited

U.S. PATENT DOCUMENTS

2024/0357072 A1 * 10/2024 Sahin ................... H04N 13/128
2025/0028300 A1 * 1/2025 Balzer ................... G06V 10/82

FOREIGN PATENT DOCUMENTS

KR         10-2253227 B1     5/2021
KR     10-2022-0043139 A     4/2022
WO     WO-2013012041 A1 *   1/2013   ......... G01N 23/2206
WO     WO 2022/128373 A1     6/2022

OTHER PUBLICATIONS

Extended European search report issued on Apr. 16, 2024, in counterpart European Patent Application No. 23186413.3 (9 pages).

* cited by examiner

METHOD AND APPARATUS WITH DEPTH INFORMATION ESTIMATION

CROSS-REFERENCE TO RELATED APPLICATIONS

This application claims the benefit under 35 USC § 119(a) of Korean Patent Application No. 10-2022-0150687, filed on Nov. 11, 2022, in the Korean Intellectual Property Office, the entire disclosure of which is incorporated herein by reference for all purposes.

BACKGROUND

1. Field

The following description relates to a method and apparatus with depth information estimation.

2. Description of Related Art

A scanning electron microscope (SEM) is an apparatus that scans a focused electron beam as a sample and observes the condition of the surface of the sample or analyzes components of the sample using electronic signals related to secondary electrons or backscattered electrons.

As fine semiconductor processes have gradually been developed for smaller and smaller areas that cannot be analyzed using existing optical systems, the use of SEMs for analyzing the same have increased. During a fine semiconductor process, obtaining a surface state of a sample, a two-dimensional planar image, using an SEM is possible. However, analyzing the structure of a sample, including a semiconductor apparatus, only with a two-dimensional planar image may be inadequate.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of estimating depth information includes generating a first simulated image using a simulator provided with a first depth map, training an artificial neural network model based on the first depth map and the first simulated image, generating a second depth map by inputting an actual image into the trained artificial neural network model, and generating a second simulated image using the simulator provided with the second depth map.

The method may further include retraining the trained artificial neural network model based on the second depth map and the second simulated image.

The method may further include generating, from the second depth map, a plurality of modified depth maps based on data augmentation including any one or any combination of any two or more of random noise addition, image rotation, scale adjustment, image movement, random crop, and color distortion, and retraining the trained artificial neural network model based on the plurality of modified depth maps and the second simulated image.

The actual image may include a scanning electron microscope (SEM) image.

The method may further include generating the first depth map based on the SEM image.

The method may further include generating the first depth map based on the SEM image and a transmission electron microscope (TEM) image.

In another general aspect, a method may include generating a depth map corresponding to an actual image by inputting the actual image to an artificial neural network model, wherein the artificial neural network model may be trained based on the depth map and a simulated image generated using a simulator provided with the depth map.

In another general aspect, an electronic apparatus may include a processor configured to generate a first simulated image by inputting an initial first depth map including any one or any combination of map information, departure information, and arrival information into a simulator, train an artificial neural network model based on the first depth map and the first simulated image, generate a second depth map by inputting an actual image into the artificial neural network model, and generate a second simulated image by inputting the second depth map into the simulator.

The electronic apparatus may further include a memory configured to store instructions; wherein the processor is further configured to execute the instructions to configure the processor to generate the first simulated image; train the artificial neural network model based on the first depth map and the first simulated image; generate the second depth map; and generate the second simulated image.

The processor may retrain the trained artificial neural network model based on the second depth map and the second simulated image.

The processor may generate, from the second depth map, a plurality of modified depth maps based on data augmentation including any one or any combination of any two or more of random noise addition, image rotation, scale adjustment, image movement, random crop, and color distortion, and retrain the trained artificial neural network model based on the plurality of modified depth maps and the second simulated image.

The actual image may include a scanning electron microscope (SEM) image.

The electronic apparatus may generate the first depth map based on the SEM image.

The electronic apparatus may generate the first depth map based on the SEM image and a TEM image.

In another general aspect, an electronic apparatus may include a memory configured to store at least one instruction and a processor configured to, by executing the instruction stored in the memory, generate a depth map corresponding to an actual image by inputting the actual image into an artificial neural network model, wherein the artificial neural network model may be trained based on a simulated image generated by inputting the depth map into a simulator and the depth map.

In another general aspect, an electronic apparatus includes a processor configured to: train an artificial neural network model based on a first depth map and a first simulated image generated by inputting the first depth map into a simulator; and retrain the trained artificial neural network mode based on a second depth map, generated by the simulator provided with the trained artificial neural network model provided with a scanning electron microscope (SEM) image, and a second simulated image, generated by the simulator provided with the second depth map.

The simulator may be a Nebula simulator.

The processor may be configured to use the electronic apparatus to estimate a depth within a semiconductor wafer.

Other features and aspects will be apparent from the following detailed description, the drawings, and the claims.

Figure 1:
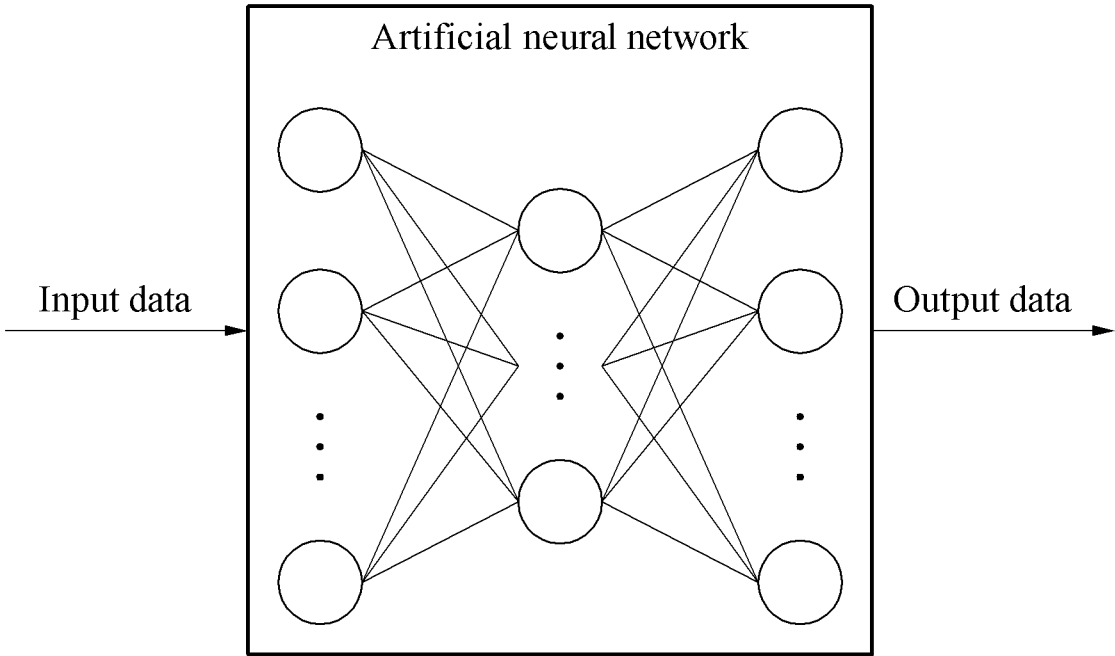
FIG. 1 illustrates an example of a deep learning operation using an artificial neural network estimation.

Throughout the drawings and the detailed description, unless otherwise described or provided, it shall be understood that the same drawing reference numerals may refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

" " " " " " " " " " " " " " " " " " " " " " " " " " " " " " "
" " " " "

Unless otherwise defined, all terms used herein including technical or scientific terms may have meanings as commonly understood by one of ordinary skill in the art to which examples based on, and after an understanding of, the disclosure of this application. Terms, such as those defined in commonly used dictionaries, should be construed to have meanings matching with contextual meanings in the relevant art and the disclosure of this application, and are not to be construed to have an ideal or excessively formal meaning unless otherwise defined herein.

The examples may be, or implemented as in, various types of computing device products, such as, for example, a personal computer (PC), a laptop computer, a tablet computer, a smartphone, a television (TV), a smart home appliance, an intelligent vehicle, a kiosk, and a wearable device. Hereinafter, examples will be described in detail with reference to the accompanying drawings.

FIG. 1 illustrates an example of a deep learning operation method using an artificial neural network.

A machine learning model, e.g., a deep learning artificial neural network (ANN) model, may include a convolution operation. In the example ANN model, nodes are connected to each other and collectively operate to process the input data. Examples of various types of neural networks may include a convolutional neural network (CNN), a recurrent neural network (RNN), a deep belief network (DBN), and a restricted Boltzmann machine (RBM) model, but the examples are not limited thereto. In a feed-forward neural network, nodes of the neural network may primarily have weighted connections to other nodes from an input to an output of the model. While examples will be discussed in the context of neural networks, this is only for the convenience of explanation and examples are not limited to the same.

FIG. 1 illustrates a structure in which input data is input to the ANN model, and the output data is output through the ANN model (e.g., a CNN) that includes one or more layers. In an example, the ANN model may be a deep neural network with two or more hidden layers.

As a non-limiting example, the ANN model may be used to extract "features," such as borders, lines, and colors from an input data. The ANN model may include a plurality of layers. Each layer may receive data, process the received data, and generate data to be output from the corresponding layer. In an example, the data output from the layer may be a feature map generated by performing a convolution operation between an image or feature map input into the ANN model and weight values of at least one filter or kernel. As a non-limiting example, some of the layers of an ANN model may be configured to sequentially extract increasingly complex features from the input data. In an example, initial layers of the ANN model may operate to extract features of a relatively low level, for example, edges or gradients, from an input data. Subsequent layers of the ANN model may extract gradually more complex features such as eyes and nose in an image.

Figure 2:
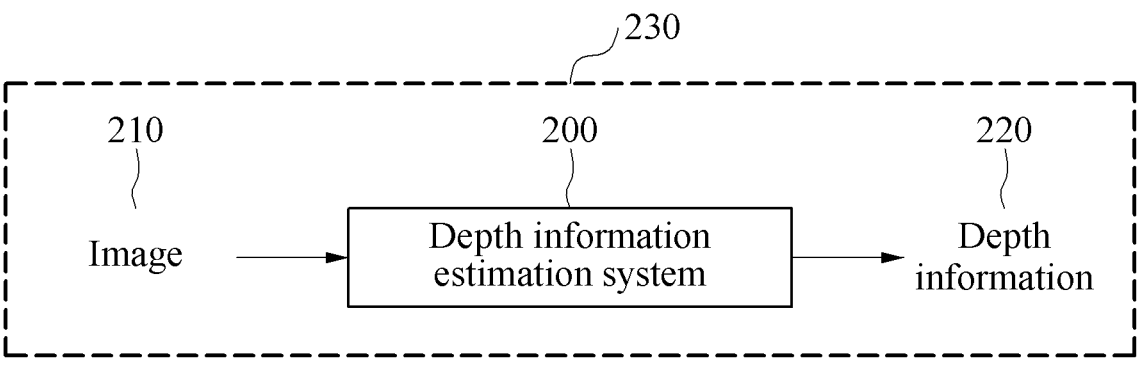
FIG. 2 illustrates an example of a system with depth information estimation, according to one or more embodiments.

FIG. 2 illustrates an example of a system for estimating depth information, according to one or more embodiments.

In FIG. 2, a computing system 200 may receive an image 210 as an input and estimate the depth information 220 corresponding to the image 210. As a non-limiting example, the electronic apparatus 230 may correspond to the electronic apparatus 800 of FIG. 8. The computing system 200 may be included in the electronic apparatus 230. The depth information 220 may be expressed in a form of a depth map. The depth map may be an image that shows relative distances of pixels present in the image 210 by differentiating the distances using a predetermined form (e.g., grayscale). For example, the depth map may express the depth information 220 of the image 210 based on pixel brightness. For example, the depth map may express the depth information 220 of the image 210 by depicting a pixel of a nearer portion brighter than a pixel of a further portion.

Hereinafter, the computing system 200 is described as an example of a system for measuring depths of a semiconductor sample. For example, the depths of a semiconductor sample may be accurately measured to control a manufacturing process for optimizing wafer yield.

In the system for measuring a depth of a semiconductor sample, an image obtained through a scanning electron microscope (hereinafter, referred to as an SEM image), an image obtained through a transmission electron microscope (hereinafter, referred to as a TEM image), an image obtained through an atomic force microscope (hereinafter, referred to as an AFM image), and the like may be used as the image 210. For example, the system for measuring a depth of a semiconductor sample may receive an SEM image, a TEM image, and/or an AFM image and estimate the depth information of a semiconductor sample.

Estimating depth information based on an SEM image may be inexpensive and fast, but its accuracy may be low. Although estimating depth information based on a TEM image may have high accuracy, because wafer cutting is required, it may be difficult to obtain a large amount of data due to the high cost. Estimating depth information based on an AFM image may have high accuracy in some local regions but have low accuracy in other regions.

The computing system 200 may include an ANN model that receives the image 210 and estimates the depth information 220 corresponding to the image 210. In general, an ANN model may be trained based on input training data and a ground truth data pair corresponding to the input training data. However, ground truth data corresponding to input training data may not be easily obtained in some cases. The depth information 220 is also representative of one or more processors, or one or more memories, storing instructions that when executed by the one or more processors configure the one or more processors to perform one or more of the methods described herein.

For example, it may be difficult for the system to measure a semiconductor sample's depth to obtain a depth map corresponding to an SEM image to the extent enough to train an ANN model.

A method with depth information estimation may estimate highly reliable depth information based on the depth information 220. For example, the depth information may be estimated by receiving the depth information 220, inputting an output of a simulator estimating the image 210 into an ANN model, and inputting an output of the ANN model back to the simulator even in a situation in which it is difficult to obtain the depth information 220 sufficient to train the ANN model, which will be described in detail below.

Figure 3:
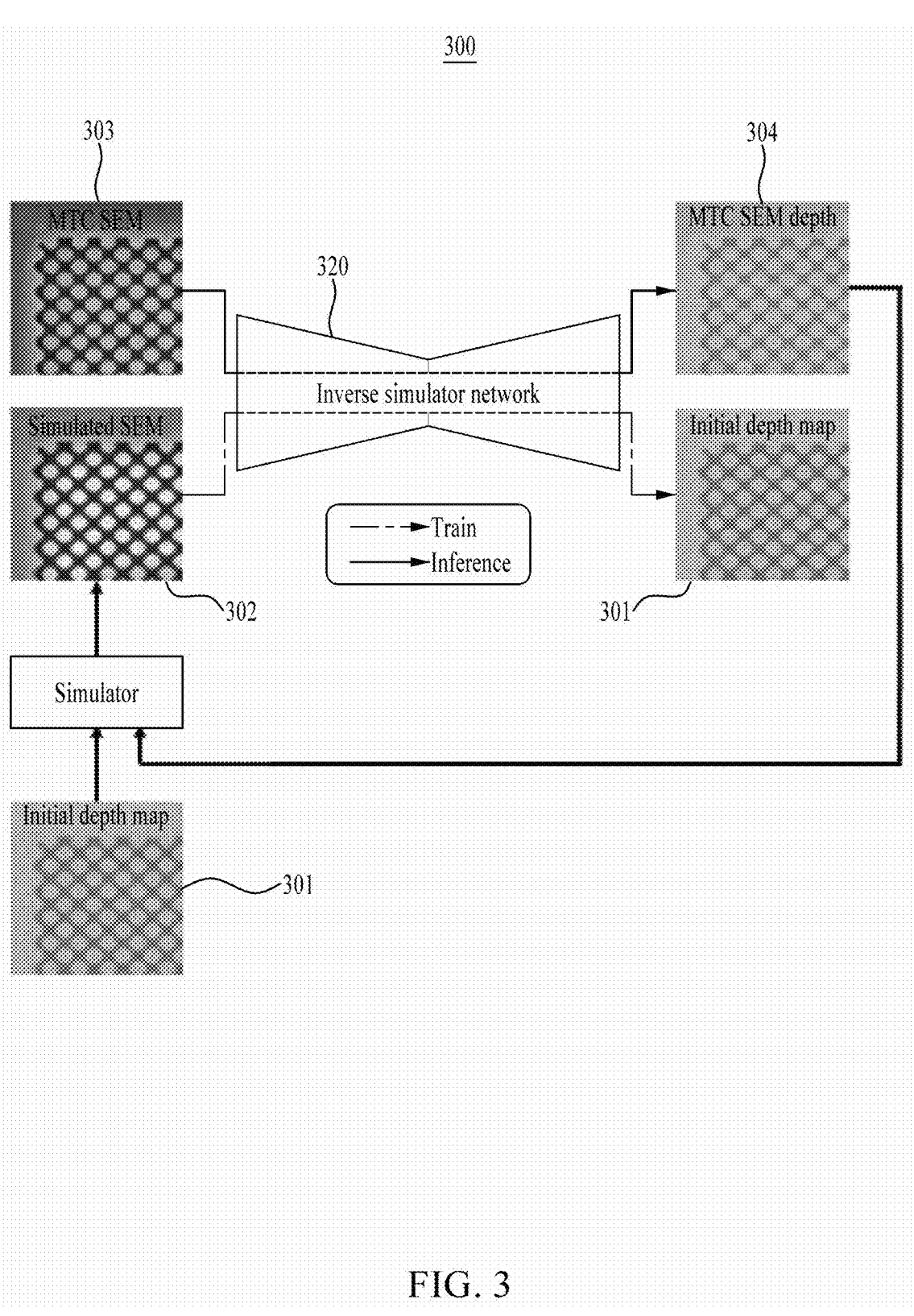
FIG. 3 illustrates an example of a method with depth information estimation, according to one or more embodiments.

FIG. 3 illustrates an example of a method with depth information estimation, according to one or more embodiments.

The description provided with reference to FIG. 2 may apply to FIG. 3, and thus, any duplicate description may be omitted. For example, the computing system 200 described with reference to FIG. 2 may also apply to processing system 300 of FIG. 3.

Referring to FIG. 3, the depth information estimation system 300 (e.g., the computing system 200 of FIG. 2) may include a simulator 310 and an ANN model 320. However, examples are possible with less than the components illustrated in FIG. 3. Therefore, it is to be understood by one of ordinary skill in the art to which the disclosure pertains and after an understanding of the disclosure of this application that some of the components shown in FIG. 3 may be omitted or new components added according to the design.

Hereinafter, for ease of description, the depth information estimation system 300 is described based on a system for measuring a depth of a semiconductor sample, but examples are not limited thereto.

The simulator 310 is representative of one or more processors, one or more processor and firmware, one or more processors and one or more memories, that receive a depth map and estimates an image (e.g., an SEM image) corresponding to the depth map. The one or more processors may be a unit including one or a combination of two or more of hardware, hardware software, or firmware. In an example, the one or more processors may include any one or any combination of an application-specific integrated circuit (ASIC) chip, field-programmable gate arrays (FPGAs), or a programmable-logic device. The depth information estimation system 300 may use an electron-matter interaction simulator, e.g., a Nebula simulator, as the simulator 310, but examples are not limited thereto.

Since a depth map to be input into the simulator 310 may not be initially available, the depth information estimation system 300 may generate an initial depth map 301. A method of generating the initial depth map 301 will be described in detail below with reference to FIG. 4.

Figure 4:
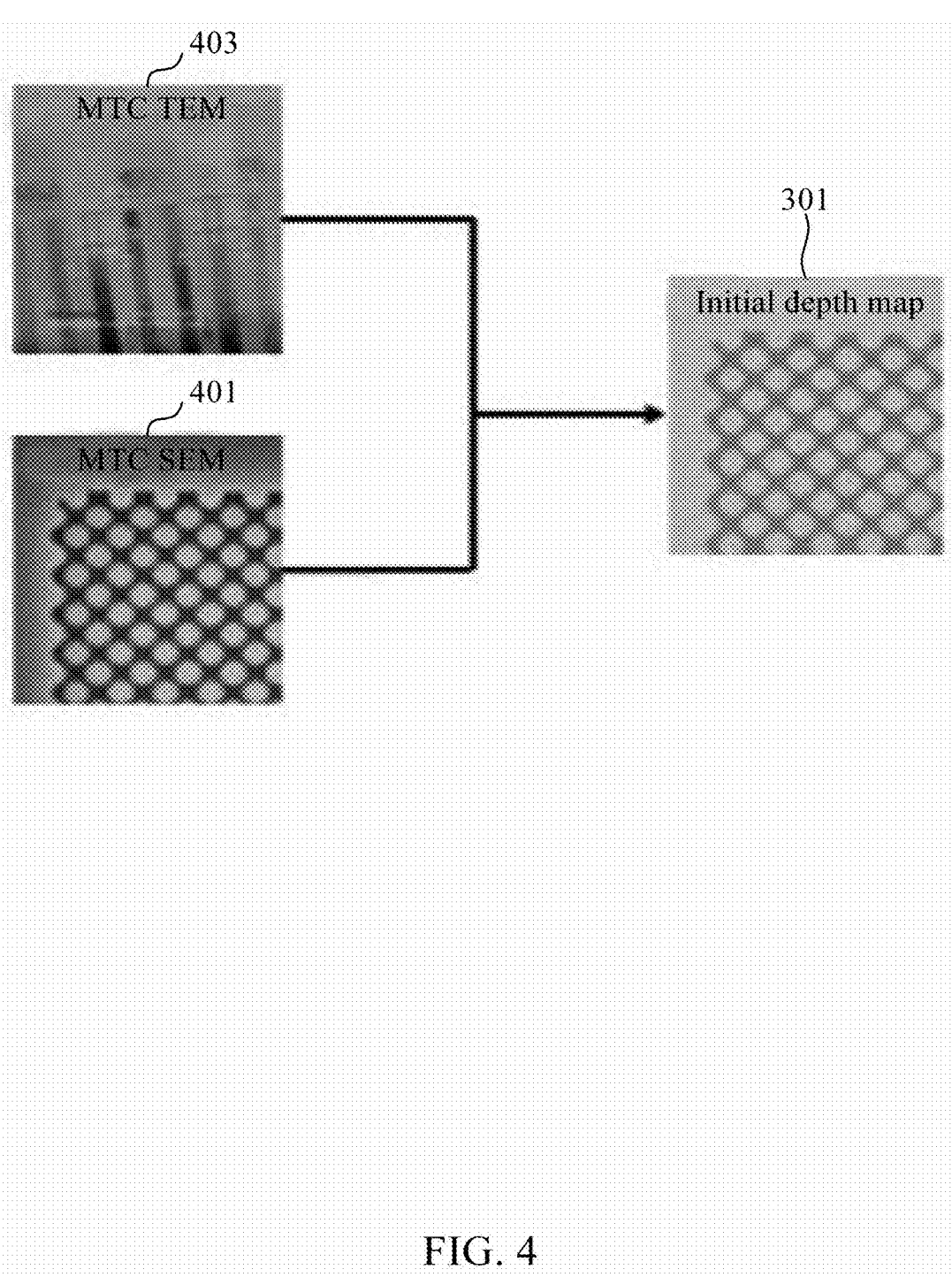
FIG. 4 illustrates an example of a method of generating an initial depth map, according to one or more embodiments.

FIG. 4 illustrates an example of a method of generating an initial depth map, according to one or more embodiments.

The description provided with reference to FIG. 3 may apply to FIG. 4, and thus, any duplicate description may be omitted.

The initial depth map 301 may be a depth map used when a separate depth map to be input into the simulator 310 is not available. The initial depth map 301 may have depth information that are less accurate than that of a depth map generated by an ANN model; however, the initial depth map 301 may have depth information (e.g., approximate shape information) that is accurate enough to be input into the simulator 310. The initial depth map 301 may be generated based on an SEM image 401 and/or a TEM image 403. However, examples are not limited thereto.

Referring to FIG. 3, the simulator 310 may receive the initial depth map 301 and estimate a simulated image (e.g., a simulated SEM image 302) corresponding to the initial depth map 301. Although it is described that the simulator 310 receives a depth map and estimates a simulated SEM image for ease of description, examples are not limited thereto.

A simulated SEM image may be referred to as a simulated SEM. The simulator 310 may generate a plurality of simulated SEM images 302 using a plurality of initial depth maps 301. The depth information estimation system 300 that obtains the simulated SEM images 302 corresponding to the initial depth map(s) 301 may train the ANN model 320. For example, the depth information estimation system 300 may train the ANN model 320 based on both the initial depth map 301 and the simulated SEM image 302.

The depth information estimation system 300 may train the ANN model 320 such that a difference between result data obtained by feed-forwarding the simulated SEM image 302 to the ANN model 320 and the initial depth map 301 is reduced. The ANN model 320, an inverse simulator, is trained to receive an image and estimate a depth map corresponding to the image.

After training the ANN model 320 based on the initial depth map 301 and the simulated SEM image 302, the depth information estimation system 300 may obtain a depth map 304 corresponding to an actual SEM image 303 by inputting the actual SEM image 303 into the ANN model 320. The simulated SEM image 302 and actual SEM image 303 may be obtained from different sources. For example, the actual SEM image may be an image obtained through a scanning electron microscope, and the simulated image may be obtained through a simulator, e.g., simulator 310. The depth map 304 obtained through the ANN model 320 may be referred to as a pseudo-depth map.

In an iteration, a depth map used as an input may be defined as a first depth map, and a pseudo-depth map may be defined as a second depth map. One iteration of multiple iterations may include operations of obtaining a simulated SEM image by inputting a depth map into the simulator 310, training the ANN model 320 based on the depth map and the simulated SEM image, and generating a pseudo-depth map by inputting an actual SEM image or the simulated SEM image into the ANN model 320.

The depth information estimation system 300 may gradually improve the performance of the ANN model 320 by performing more than one iteration. For example, in a second iteration, the depth information estimation system 300 may obtain a simulated SEM image corresponding to the depth map 304 by inputting the depth map 304 into the simulator 310 again and train the ANN model 320 again using the simulated SEM image and the depth map 304. The depth map 304 used to train the ANN model 320 in the second iteration may have accuracy higher than the initial depth map 301 used in a first iteration. Thus, the performance of the ANN model 320 may be improved by performing iterations on the depth information estimation system 300 because the ANN model 320 is trained with data that becomes more accurate as iterations continue.

The depth information estimation system 300 may obtain a depth map corresponding to an image using the trained ANN model 320. For example, the trained ANN model 320 may receive an actual SEM image and output a depth map corresponding to the image.

Figure 5:
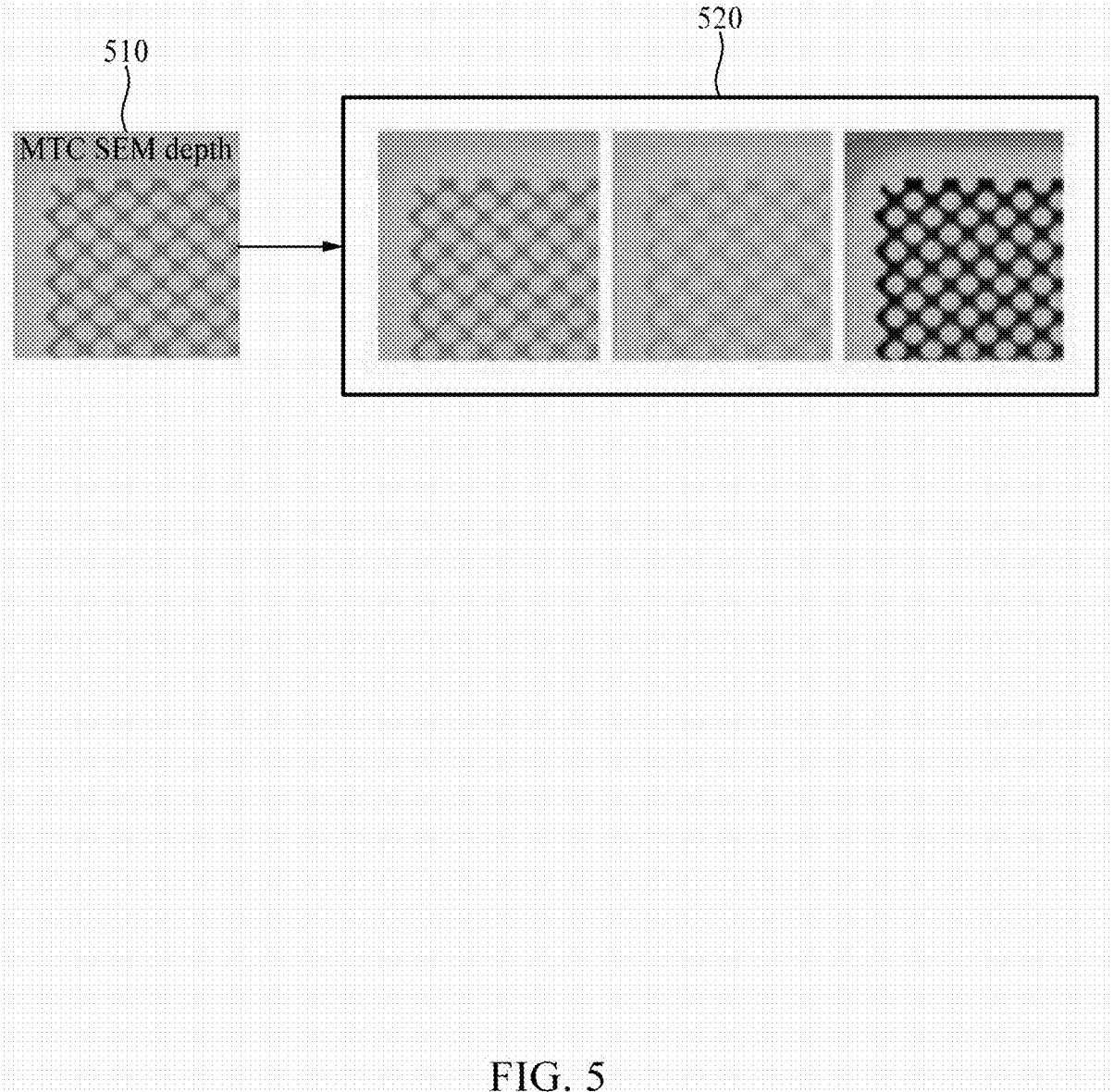
FIG. 5 illustrates an example of a method of augmenting data, according to one or more embodiments.

FIG. 5 illustrates an example of a method of augmenting data, according to one or more embodiments.

The description provided with reference to FIG. 3 may apply to FIG. 5, and thus, any duplicate description may be omitted.

Referring to FIG. 5, a depth information estimation system (e.g., the depth information estimation system 300 of FIG. 3) may generate a plurality of modified depth maps 520 by performing data augmentation on a depth map 510 (e.g., the depth map 304 of FIG. 3).

The depth information estimation system may perform data augmentation, such as random noise addition, image rotation, scale adjustment, image movement, random crop, or color distortion on a pseudo-depth map obtained through an ANN model (e.g., the ANN model 320 of FIG. 3) and obtain a wide variety of image-depth map pair data using the plurality of modified depth maps 520 generated through the data augmentation.

The depth information estimation system may obtain a simulated SEM image by inputting the plurality of modified depth maps 520 into a simulator (e.g., the simulator 310 of FIG. 3) and train an ANN model based on the modified depth maps and the simulated SEM image.

Figure 6:
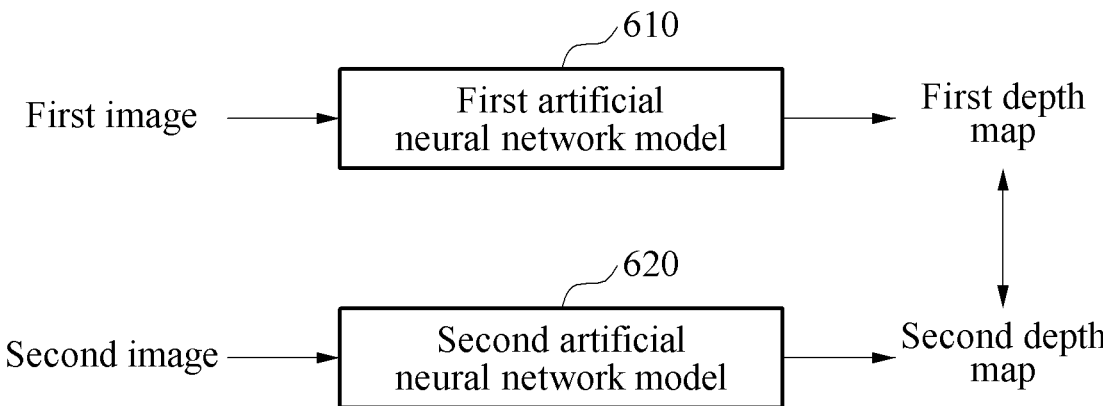
FIG. 6 illustrates an example with depth information scaling, according to one or more embodiments.

FIG. 6 illustrates an example of a method of scaling depth information, according to one or more embodiments.

The description provided with reference to FIG. 3 may apply to FIG. 6, and thus, any duplicate description may be omitted.

Referring to FIG. 6, a depth information estimation system may include a first ANN model 610 and a second ANN model 620.

The first ANN model 610 (e.g., the ANN model 320 of FIG. 3) may receive a first image and estimate a first depth map corresponding to the first image. The second ANN model 620 may be an ANN model that estimates a second depth map based on a second image including a target identical to a target included in an image used for the first ANN model 610. The second image may be obtained differently from the image used for the first ANN model 610. For example, the first image may be an SEM image, and the second image may be an AFM image.

However, examples are not limited thereto.

As described above, estimating depth information based on the AFM image may result in a relatively high accuracy in some local regions. A computing system may detect a region with relatively high accuracy in the second depth map, estimated based on the AFM image, and train the first ANN model 610 by determining the first depth map corresponding to the second depth map in the corresponding region such that a difference between the first depth map and the second depth map is reduced.

The computing system may use the AFM image in addition to the SEM image to improve accuracy by scaling (e.g., scaling in nanometers) a depth map.

Figure 7:
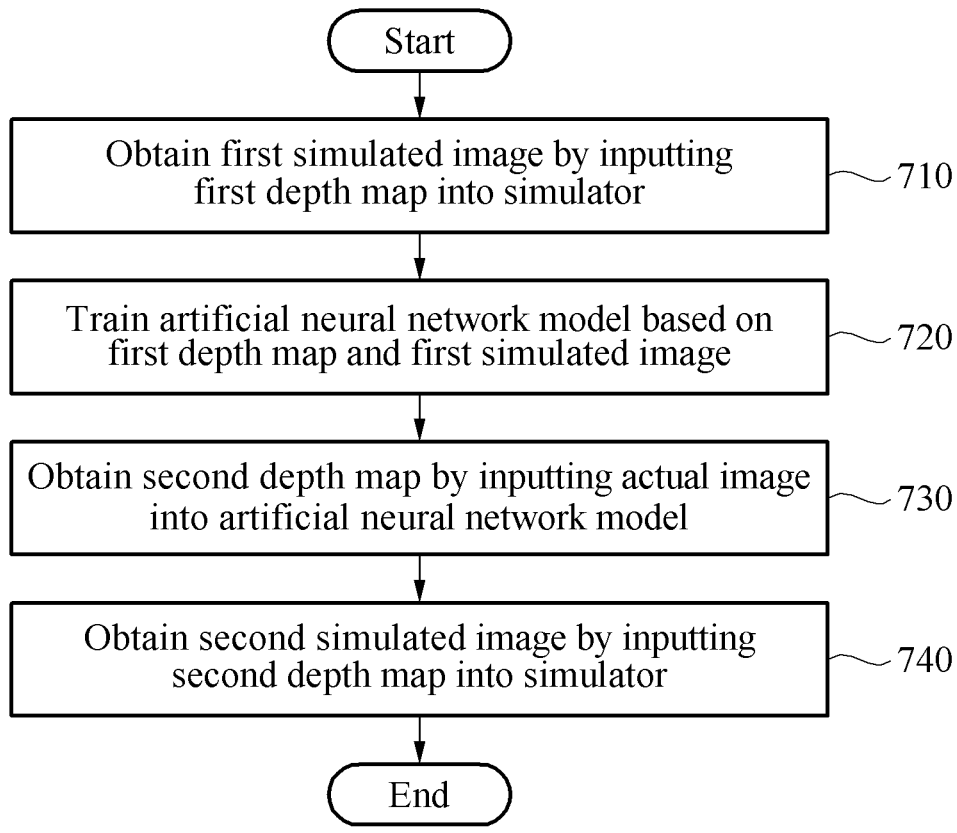
FIG. 7 is a flowchart illustrating a method with depth information estimation, according to one or more embodiments.

FIG. 7 is a flowchart illustrating a method with depth information estimation, according to one or more embodiments.

The description provided with reference to FIG. 3 may apply to FIG. 7, and thus, any duplicate description may be omitted. For ease of description, it is described that operations 710 through 740 are performed using the depth information estimation system illustrated in FIG. 3. However, operations 710 through 740 may be performed by another suitable electronic apparatus in a suitable system.

Furthermore, the operations of FIG. 7 may be performed in the shown order and manner. However, the order of some operations may be changed, or some operations may be omitted, without departing from the spirit and scope of the shown example. Further, the operations illustrated in FIG. 7 may be performed in parallel or simultaneously.

Referring to FIG. 7, in operation 710, a depth information estimation system may obtain a first simulated image by inputting a first depth map into a simulator. The first depth map may be a depth map used as an input in an iteration and may include an initial depth map.

In operation 720, the depth information estimation system may train an ANN model based on the first depth map and the first simulated image.

In operation 730, the depth information estimation system may obtain a second depth map by inputting an actual image into the ANN model.

In operation 740, the depth information estimation system may obtain a second simulated image by inputting the second depth map into the simulator.

Further, the depth information estimation system may train the ANN model based on the second depth map and the second simulated image.

Figure 8:
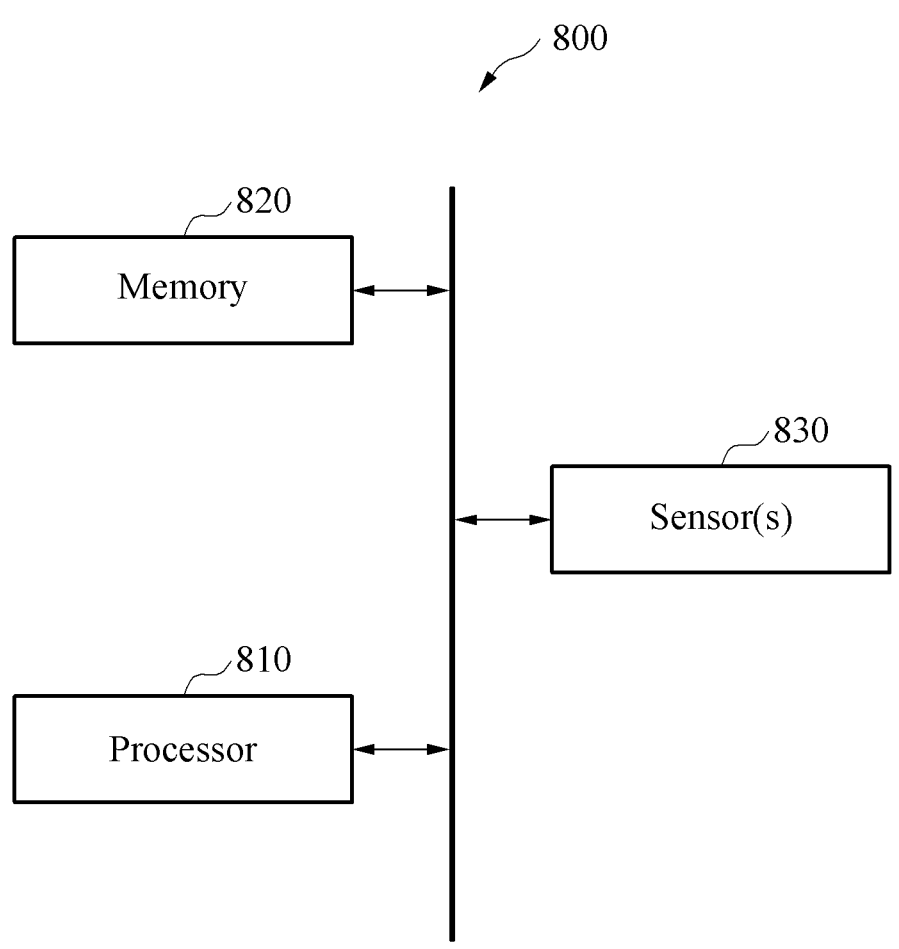
FIG. 8 illustrates an example of an electronic apparatus, according to one or more embodiments.

FIG. 8 illustrates an example of a configuration of an electronic apparatus or system, according to one or more embodiments.

Referring to FIG. 8, an electronic apparatus or system 800 may include at least one processor 810, a memory 820, and sensor(s) 830. The description provided with reference to FIGS. 1 through 7 may also apply to FIG. 8. An example of a computing system may be, or include the electronic apparatus 800.

The memory 820 may store computer-readable instructions. When the instructions stored in the memory 820 are executed by the processor 810, the processor 810 may process operations defined by the instructions. The memory 820 may include, for example, random-access memory (RAM), dynamic random-access memory (DRAM), static random-access memory (SRAM), or other types of non-volatile memory known in the art. The memory 820 may store a pre-trained ANN model.

The sensor(s) 830 may include any one or any combination of an SEM, a TEM, and an AFM. However, examples are not limited thereto. Operations of each sensor may be intuitively inferable from its name by one of ordinary skill in the art, and thus, a detailed description thereof will be omitted herein.

The at least one processor 810 may control the overall operation of the electronic apparatus 800. The processor 810 may be a hardware-implemented apparatus with a physically structured circuit to execute desired operations. The desired operations may include code or instructions included in a program. The hardware-implemented apparatus may include, for example, a microprocessor, a central processing unit (CPU), a graphics processing unit (GPU), a processor core, a multi-core processor, a multiprocessor, an (ASIC), an FPGA, and a neural processing unit (NPU).

The processor 810 may obtain a first simulated image by inputting a first depth map into a simulator, train an ANN model based on the first depth map and the first simulated image, obtain a second depth map by inputting an actual image into the ANN model, and obtain a second simulated image by inputting the second depth map into the simulator.

The depth information estimation system in FIGS. 1-8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   generating a first simulated image using a simulator provided with a first depth map;
   training an artificial neural network model based on the first depth map and the first simulated image;
   generating a second depth map using the trained artificial neural network model provided with an actual image into the trained artificial neural network model; and
   generating a second simulated image using the simulator provided with the second depth map.

2. The method of claim 1, further comprising:
   retraining the trained artificial neural network model based on the second depth map and the second simulated image.

3. The method of claim 1, further comprising:
   generating, from the second depth map, a plurality of modified depth maps based on data augmentation comprising any one or any combination of any two or more of random noise addition, image rotation, scale adjustment, image movement, random crop, and color distortion; and
   retraining the trained artificial neural network model based on the plurality of modified depth maps and the second simulated image.

4. The method of claim 1, wherein the actual image comprises a scanning electron microscope (SEM) image.

5. The method of claim 4, wherein the first depth map is generated based on the SEM image.

6. The method of claim 4, wherein the first depth map is generated based on the SEM image and a transmission electron microscope (TEM) image.

7. A processor-implemented method, the method comprising:
   generating a depth map corresponding to an actual image by inputting the actual image to an artificial neural network model, wherein the artificial neural network model is trained based on the depth map and a simulated image generated by using a simulator provided with the depth map.

8. A non-transitory computer-readable storage medium storing instructions that, when executed by a processor, cause the processor to perform the method of claim 7.

9. An electronic apparatus comprising:

a processor configured to:

generate a first simulated image by inputting a first depth map into a simulator;

train an artificial neural network model based on the first depth map and the first simulated image;

generate a second depth map by inputting an actual image into the trained artificial neural network model; and generate a second simulated image by inputting the second depth map into the simulator.

10. The electronic apparatus of claim 9, further comprising a memory storing instructions;

wherein the processor is further configured to execute the instructions to configure the processor to perform the generation of the first simulated image, training of the artificial neural network model based on the first depth map and the first simulated image, the generation of the second depth map, and the generation of the second simulated image.

11. The electronic apparatus of claim 9, wherein the processor is configured to retrain the trained artificial neural network model based on the second depth map and the second simulated image.

12. The electronic apparatus of claim 9, wherein the processor is configured to generate, from the second depth map, a plurality of modified depth maps based on data augmentation comprising any one or any combination of any two or more of random noise addition, image rotation, scale adjustment, image movement, random crop, and color distortion, and retrain the trained artificial neural network model based on the plurality of modified depth maps and the second simulated image.

13. The electronic apparatus of claim 9, wherein the actual image comprises a scanning electron microscope (SEM) image.

14. The electronic apparatus of claim 13, wherein the processor is configured to generate the first depth map based on the SEM image.

15. The electronic apparatus of claim 13, wherein the processor is configured to generate the first depth map based on the SEM image and a transmission electronic microscope (TEM) image.

16. An electronic apparatus comprising:

a processor configured to:

train an artificial neural network model based on a first depth map and a first simulated image generated using a simulator provided with the first depth map; and retrain the trained artificial neural network mode based on a second depth map, generated by the simulator provided with the trained artificial neural network model provided with a scanning electron microscope (SEM) image, and a second simulated image, generated by the simulator provided with the second depth map.

17. The electronic apparatus of claim 16, wherein the simulator is a Nebula simulator.

18. The electronic apparatus of claim 16, wherein the processor is configured to use the electronic apparatus to estimate a depth within a semiconductor wafer.

\* \* \* \* \*